(12) United States Patent
Ranković et al.

(10) Patent No.: US 10,089,038 B2
(45) Date of Patent: Oct. 2, 2018

(54) LOCK-FREE FIRST IN, FIRST OUT MEMORY QUEUE ARCHITECTURE

(71) Applicant: Invensys Systems, Inc., Foxboro, MA (US)

(72) Inventors: Rade Ranković, Novi Sad (RS); Collin Miles Roth, Vancouver (CA)

(73) Assignee: Schneider Electric Software, LLC, Lake Forest, CA (US)

( * ) Notice: Subject to any disclaimer, the term of this patent is extended or adjusted under 35 U.S.C. 154(b) by 281 days.

(21) Appl. No.: 15/193,906

(22) Filed: Jun. 27, 2016

(65) Prior Publication Data

US 2017/0371590 A1 Dec. 28, 2017

(51) Int. Cl.
*G06F 3/06* (2006.01)

(52) U.S. Cl.
CPC .......... *G06F 3/0659* (2013.01); *G06F 3/0619* (2013.01); *G06F 3/0673* (2013.01)

(58) Field of Classification Search
CPC ...... G06F 12/00–12/16; G06F 13/00–13/4295
See application file for complete search history.

(56) References Cited

U.S. PATENT DOCUMENTS

| | | | | |
|---|---|---|---|---|
| 5,381,528 | A * | 1/1995 | Brunelle | G06F 3/0601 710/56 |
| 9,268,698 | B1 | 2/2016 | Lunev | |
| 2004/0181635 | A1 | 9/2004 | Huras et al. | |
| 2009/0249356 | A1* | 10/2009 | He | G06F 9/526 719/314 |
| 2013/0246672 | A1 | 9/2013 | Saputra | |
| 2014/0282558 | A1 | 9/2014 | Brooker et al. | |

OTHER PUBLICATIONS

Extended European Search Report for 17178030.7, dated Oct. 25, 2017.

* cited by examiner

*Primary Examiner* — Nicholas Simonetti
(74) *Attorney, Agent, or Firm* — Senniger Powers LLP

(57) ABSTRACT

First in, first out (FIFO) memory queue architecture enabling a plurality of writers and a single reader to use the queue without mutual exclusive locking. The FIFO queue is implemented using an array. A write counter value associated with the array provides a reservation value to each writer that is mutually exclusive of the value provided to every other writer. A read counter value associated with the array prevents writers from writing over data messages stored in the array that are yet to be read by the single reader.

20 Claims, 6 Drawing Sheets

LOCK-FREE FIRST IN, FIRST OUT MEMORY QUEUE ARCHITECTURE

TECHNICAL FIELD

Aspects of the present disclosure generally relate to memory device architectures that store data values representing aspects of components in industrial processes. More particularly, aspects relate to systems and methods for enabling multiple writers to store data values and a reader to access stored data values without mutual exclusive locks.

BACKGROUND

Conventional systems and methods require the use of mutual exclusion locks when multiple writers and a single reader operate on the same memory queue. When two writers attempt to write at the same instant in time, these conventional queues result in one of the writers locking out other writers from performing writing operations on the queue. These locked-out writers are blocked from writing and must wait for the writer holding the lock to finish its writing operation. Writers may also be blocked by a reader in these conventional systems and methods. Accordingly, only one thread can read from or write to the array at a single instant in time, regardless of processor availability. Operation in accordance with these conventional systems and methods prevent true parallelism which makes them unsuitable for critical real-time systems, for example. Some conventional systems and methods utilize more than one input array, but these approaches require unnecessary utilization of memory resources.

SUMMARY

Aspects of the disclosure provide a memory array architecture that enables multiple writers and a single reader to utilize a memory array as a first in, first out (FIFO) queue without the need for mutual exclusive locks. Aspects of the disclosure further enable a plurality of writers to simultaneously write data messages onto the memory array and the reader to read data messages off of the memory array without blocking.

In an aspect, computing devices implement a method of synchronizing writer threads on an array, which is used in a circular manner. The circular array includes memory chunks and each memory chunk is mapped to a storage cell of a memory storage device. A first writer thread reserves one or more memory chunks of the circular array for a data message associated with the first writer thread. A first write count value corresponding to the memory chunks reserved by the first writer thread is mutually exclusive of one or more write count values corresponding to memory chunks reserved by other writer threads. The first writer thread writes its data message to its reserved memory chunks of the circular array when a read count value representing a current index of a reader thread on the circular array is less than one iteration of the circular array from the first write count value.

In another aspect, a computer readable storage device stores processor readable instructions that, when executed by a processor, implement a method of coordinating writer threads on a queue. Each writer thread increments a write counter as a function of a size of a data message of each writer thread. Each writer thread is associated with its incremented value of the write counter. The write counter value associated with each writer thread is mutually exclusive of the write counter values associated with every other writer thread. Each writer thread reserves one or more memory chunks of the queue for its data message. The memory chunks reserved by each writer thread have an element identifier within the queue that is the modulus of the write counter value associated with the writer thread and a size of the queue. Each writer thread writes its data message to its reserved memory chunks of the queue when a read count value representing a current position of a reader thread on the queue is less than one iteration of the queue from each writer thread.

In yet another aspect, a computing device includes a processor and processor-executable instructions stored on a computer-readable storage medium of the computing device. The processor-executable instructions include instructions that, when executed by the processor, provide an array of memory chunks, a write chunk counter, and a read chunk counter. Each memory chunk of the array represents one or more contiguous memory addresses in an address space. The array has a predefined size and is adapted for a first-in, first-out utilization of the memory chunks. The write chunk counter is an index for writer threads on the array. The write chunk counter provides a value to each writer thread that is mutually exclusive of the value provided to every other writher thread for reserving one or more of the memory chunks. The read chunk counter includes an index and a number of iterations of a reader thread on the array. The memory chunks are adapted to have a data message associated with each of the writer threads written to them by the writer threads when the read chunk counter is less than one iteration of the array from the index of the writer threads.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
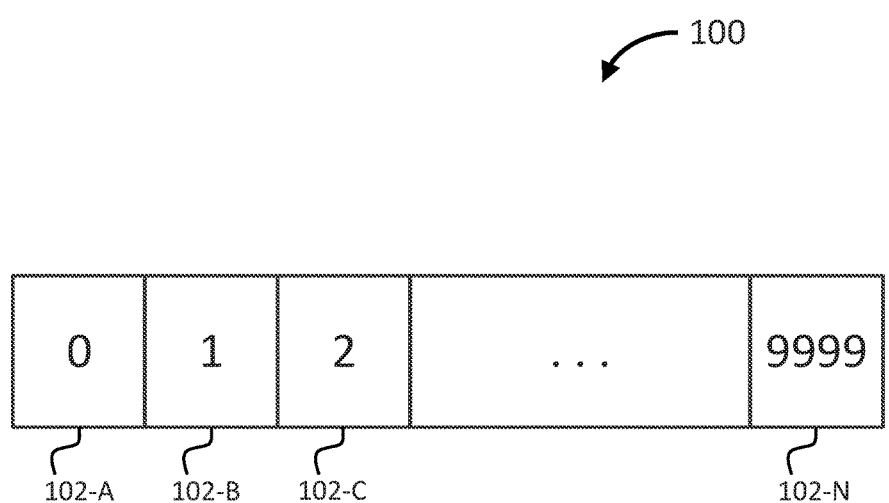
FIG. 1 illustrates an exemplary array of memory chunks according to an embodiment of the disclosure.

FIG. 1 illustrates an exemplary architecture of an array, generally indicated at 100, comprised of memory chunks 102 in accordance with an embodiment of the disclosure. Each memory chunk 102 represents a pre-allocated section of continuous memory (e.g., virtual memory) of a predefined size. In an embodiment, the memory chunks 102 are logically represented as separate chunks and are a contiguous region of memory. A message of such size that it requires more than one chunk to store is copied into the buffer (e.g., memory buffer register) as a contiguous unit in accordance with an aspect of the disclosure. In the exemplary embodiment of array 100 illustrated in FIG. 1, each memory chunk 102 is 10 kilobytes (KB) in size and array 100 is comprised of 10,000 memory chunks. One having ordinary skill in the art will understand that memory chunks 102 having different sizes and array 100 comprised of a different number of memory chunks are within the scope of the disclosure. In an embodiment, array 100 is a linear, one-dimensional array in a circular configuration.

In accordance with an aspect of the disclosure, array 100 comprises a virtual memory space. In such an embodiment, memory chunks 102 may be referred to as memory addresses. Each memory chunk 102 may be mapped to one or more corresponding storage cells of a memory storage device, such as a random access memory (RAM), of a computing device. In an embodiment, the mapping is accomplished by a memory management unit (MMU) or the like.

One having ordinary skill in the art will understand that array 100 may also be referred to as a queue within the scope of the disclosure. The size of the queue is defined by the number of memory chunks 102 multiplied by the block size of each memory chunk. For example, a queue allocated with 10,000 memory chunks 102, each memory chunk being 10 kilobytes (KB) in size, would have 100 megabytes (MB) of space available. For sake of brevity, the following description assumes a queue equal in size to array 100, but one having ordinary skill in the art will understand that the size of the queue may differ from the size of array 100. In accordance with an aspect of the disclosure, the size of the queue is application specific.

Figure 2:
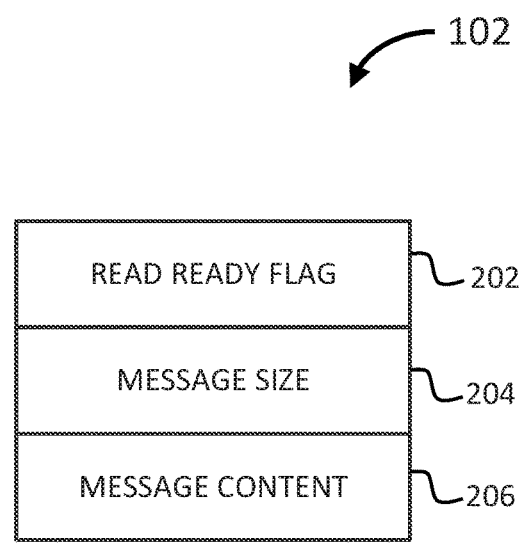
FIG. 2 an exemplary memory chunk of the array of FIG. 1 according to an embodiment.

FIG. 2 illustrates an exemplary architecture of one of memory chunks 102. In the illustrated embodiment, memory chunk 102 includes a read ready flag value 202, a message size value 204, and a message content byte array 206.

The read ready flag value 202 is a byte flag that identifies whether a writer thread has written a message to the memory chunk 102, and therefore the memory chunk is ready for having the written message read by a reader thread. In an embodiment, the default value of read ready flag value 202 after allocation of memory chunk 102 is logical false. The read ready flag value 202 is set to logical true when a writer thread that has reserved memory chunk 102 is finished writing the message content. The read ready flag value 202 is set to logical false when a reader thread is finished reading memory chunk 102. One having ordinary skill in the art will understand that operation may be inverted such that read ready flag value 202 is set to logical true within an aspect of the disclosure.

The message size value 204 is an unsigned integer representing a size of a message written to memory chunk 102 in accordance with an aspect of the disclosure. In an embodiment, the message size value 204 is less than or equal to the size of array 100. The message content byte array 206 is an array of bytes representing content of a message written to memory chunk 102.

Figure 3:
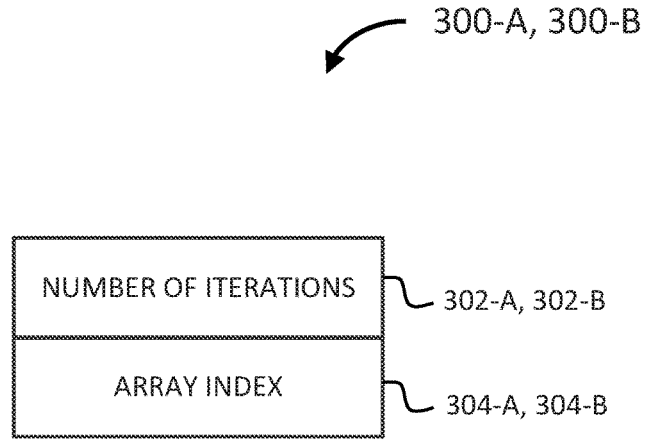
FIG. 3 illustrates an exemplary counter according to an embodiment.

FIG. 3 illustrates an exemplary architecture of a counter, generally indicated at 300, in accordance with an embodiment of the disclosure. In accordance with an aspect of the disclosure, there are two instances of counter 300. One instance of counter 300 comprises a write counter 300-A (e.g., WriteChunkCounter) associated with one or more writer threads. The second instance of counter 300 comprises a read counter 300-B (e.g., ReadChunkCounter) associated with a reader thread. In accordance with an aspect of the disclosure, array 100 utilizing write counter 300-A and read counter 300-B enables synchronization (i.e., coordination) of a plurality of writer threads and a single reader thread on array 100. In an embodiment, both instances of counter 300 represents an index to a pre-allocated array of memory blocks (e.g., array 100). In the illustrated embodiment, counter 300 includes a number of iterations value 302 and an array index value 304. The number of iterations value 302 comprises a number of times a thread associated with counter 300 has iterated (i.e., circled) around array 100. The array index value 304 represents a position of a thread associated with counter 300 along array 100. In an embodiment, counter 300 is a 64-bit unsigned integer that is incremented by a thread, as further described herein. In an embodiment, the values of write counter 300-A and read counter 300-B are each set to zero, meaning they will point to the first element in array 100.

Figure 4:
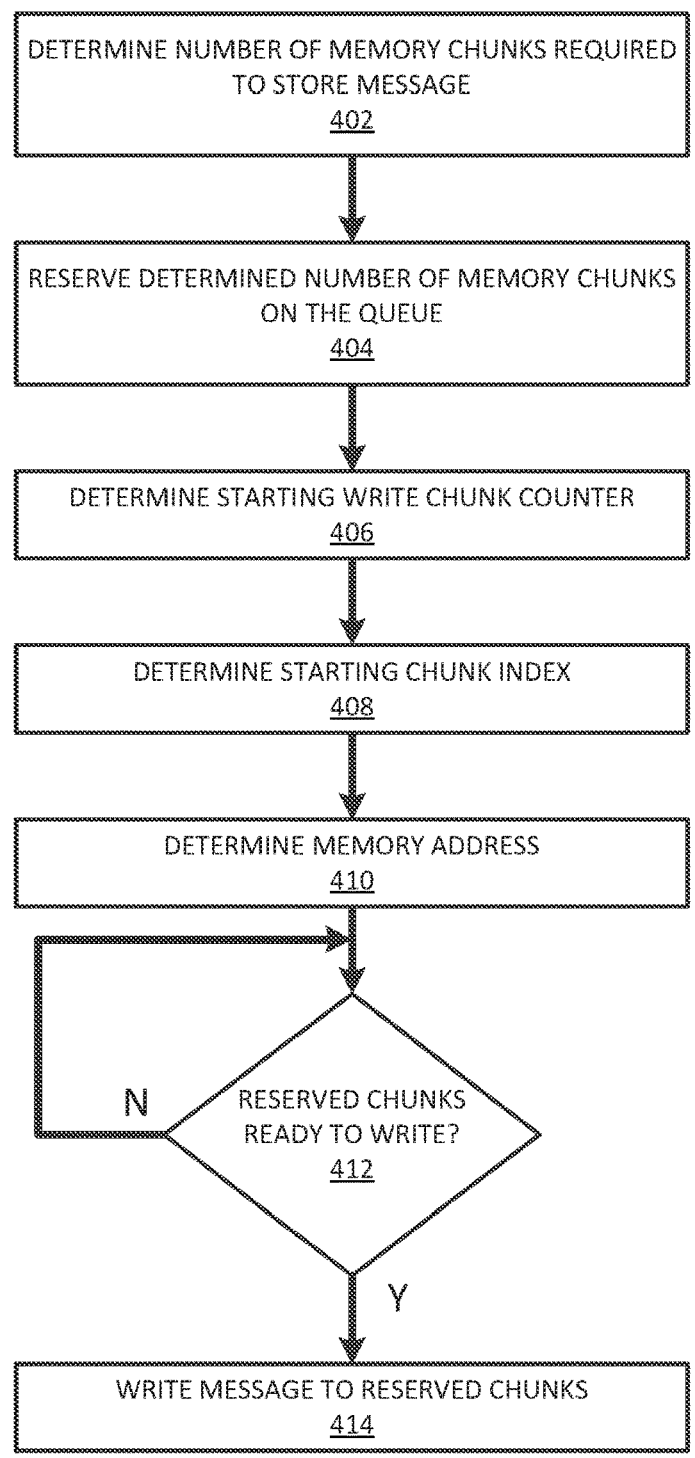
FIG. 4 illustrates an exemplary writing operation according to an embodiment.

FIG. 4 illustrates an exemplary writing operation in accordance with an embodiment of the disclosure. The exemplary implementation of aspects of the disclosure described herein relies on the use of processor-level atomic operations supported on common processor architectures. The description contained herein assumes array 100 implemented in a C# (C Sharp) programming language and a managed wrapper around, for example, a WIN API (Windows application programming interface) add method is utilized (e.g., Interlocked.Add Method (Int64, Int64)). One having ordinary skill in the art will understand that features described herein may be implemented in other programming languages within the scope of the disclosure. The exemplary built-in managed call above may cast the signed integer (e.g., Int64) to and from an unsigned 64-bit integer (e.g., UInt64) in accordance with an aspect of the disclosure to enable an add method (e.g., Interlocked.Add( ) to properly rollover when reaching the end of array 100 without throwing an exception. In such an embodiment, casting preserves the full unsigned 64-bit maximum value.

Referring further to FIG. 4, a writer thread determines, at step 402, a number of memory chunks 102 required to store a data message of the writer thread. In an embodiment, step 402 comprises a writer thread calling a function to determine a size of the data message. For example, a writer thread will determine two memory chunks 102 are required to store a 20 KB data message when each memory chunk is 10 KB in size. An exemplary pseudocode for performing the determination at step 402 is:

UInt64 numberOfChunks=GetRequiredNumberOfChunks(message);

After determining the required number of memory chunks 102, the writer thread reserves the determined number of memory chunks 102 on array 100 at step 404. In an embodiment, step 404 comprises the writer thread atomically incrementing, at a processor level, write counter 300-A by the determined number of chunks from step 402. Atomically incrementing write counter 300-A guarantees the writer thread a continuous, mutually exclusive range of memory chunks 102. In other words, atomically incrementing write counter 300-A reserves a portion of array 100 for the data message of the writer thread by reserving a mutually exclusive value of counter 300-A. An exemplary pseudocode for performing the reservation at step 404 is:

UInt64 newWriteChunkCounter= IncrementWriteChunkCounter(numberofChunks);

UInt64 indexLocation=newWriteChunkCounter mod ArraySize;

The returned value of the processor-level atomic increment is representative of the index location where a subsequent writer thread will store a data message. In other words, the returned value modulus the size of array 100 is the tail edge of the array location where a data message of the current writer thread will be written. In an embodiment in which there are multiple writer threads on array 100, each writer thread will perform the processor-level atomic increment independently of each other in order to reserve separate, mutually exclusive portions of array 100.

Upon reserving memory chunks 102 at step 404, the writer thread is unaware of the details of the reservation. In other words, the writer thread has used write counter 300-A to prevent other writer threads from reserving a portion of array 100 required for the message of the current writer thread, but the writer thread does not have an array index or a memory address for writing the message. At step 406, the writer thread determines the starting write chunk counter. In an embodiment, the writer thread calculates the starting write chunk counter by subtracting the required number of memory chunks 102 (e.g., the value determined at step 402) from atomically incremented write counter 300-A (e.g., the value determined at step 404). An exemplary pseudocode for performing the determination at step 406 is:

UInt64 startWriteChunkCounter= newWriteChunk-
        Counter–numberOfChunks;

At step 408, the writer thread determines the starting chunk index on the array 100. In an embodiment, write counter 300-A is a continuously incrementing counter and the writer thread determines the starting chunk index by performing a modulus operation against the total number of memory chunks 102 in array 100. In another embodiment in which the size of array 100 is a multiple of two, the writer thread determines the starting chunk index by utilizing a bitmask of the chunk count. An exemplary pseudocode for performing the determination at step 408 is:

UInt64 chunkIndex=startWriteChunkCounter %_
        chunkCount;

At step 410, the writer thread determines the actual memory address into which the data message will be written. In an embodiment, the writer thread uses the starting chunk index and a size of memory chunks 102 to determine the memory address. An exemplary pseudocode for performing the determination at step 410 is:

UInt64 offset=chunkIndex*_chunkSize;

MemoryChunk*memoryChunk=(MemoryChunk*)
        (_chunkArray+offset);

Although the writer thread reserved memory chunks 102 at step 404, it is possible that a reader thread has not finished reading messages previously stored in those reserved memory chunks, in accordance with an embodiment of the disclosure. For instance, depending on how many writer threads are ahead of the current writer thread, it is possible that the reader thread needs to loop around array 100 several times before the reserved memory chunks 102 are ready to have written thereto the data message of the current writer thread. In other words, because write counter 300-A increments continuously and may exceed the size of array 100, the current writer thread can reserve memory chunks 102 ahead of the reader thread by more than one iteration of the array 100. When the current writer thread has reserved memory chunks 102 by obtaining a value of write counter 300-A that is ahead of the current index of the reader thread, as represented by read counter 300-B, by one iteration or more of the array 100, the writer thread must wait until the reader thread has finished reading data messages stored in the reserved memory chunks by other writer threads.

In an embodiment, the writer thread checks whether the reserved memory chunks 102 are ready at step 412 by subtracting a current value of read counter 300-B (e.g., ReadChunkCounter) from the value of the write counter 300-A (e.g., newWriteChunkCounter) that was returned during the reservation at step 404. When the subtraction results in a value larger than the capacity of array 100, the writer thread cannot write its message because the reader thread is one or more iterations behind the writer thread. The writer thread determines the reserved chunks are not ready to write and spins to wait for the reader thread to catch up. In an embodiment, the writer thread spins in a loop (e.g., for loop, while loop, etc.) and/or sleeps until the reader thread catches up. Preferably, the queue is sized to prevent spinning. As soon as the reader thread catches up by reading messages from memory chunks 102 less than one iteration of array 100 from the writer thread, the writer thread determines the reserved memory chunks 102 are ready and it is safe to write the message. In an embodiment, the writer thread sleeps for a predetermined increment, such as about 15 milliseconds (ms). An exemplary pseudocode for performing the determination at step 412 is:

while((newWriteChunkCounter – _readChunkCounter) >=
    _chunkCounter)
    {
            // Spin, while continuously performing the above
            // subtraction. In an embodiment, may sleep for a 15ms
            // increment.
    }

Figure 5:
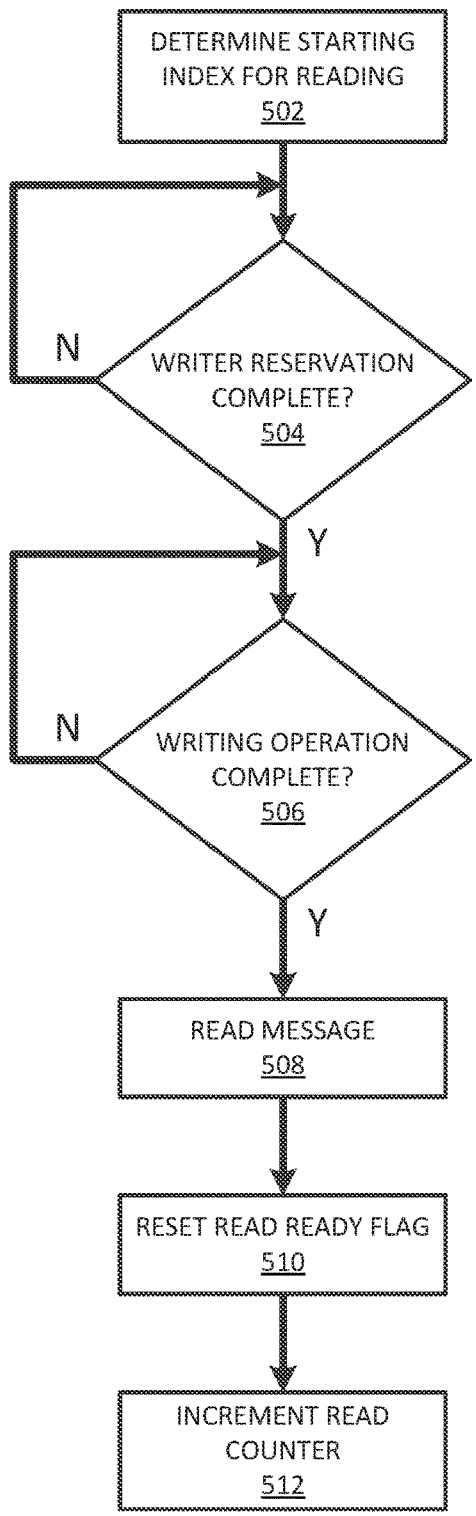
FIG. 5 illustrates an exemplary reading operation according to an embodiment.

Upon determining the reserved memory chunks 102 are ready, the writer thread writes its message to the reserved memory chunks at step 414. In an exemplary embodiment, step 414 comprises the writer thread writing the size of the message content to message size value 204 and performing a copy memory block function, such as memcpy, and the memory address is determined at step 410. The calculated offset is within the first chunk of the message of the writer thread following content associated with read ready flag 202 (e.g., ReadReadyFlag) and a size of message content 206 (e.g., MessageSize). In an embodiment in which a message requires multiple memory chunks 102, ReadReadyFlag and MessageSize contents are set within the first chunk of the message and read by the reader thread from that first chunk, and the actual message content is copied continuously into multiple subsequent memory chunks. An exemplary pseudocode for performing the writing operation at step 414 is:

memoryChunk -> WriteMessage(message);
    memoryChunk -> SetReadReadyFlag(true);

FIG. 5 illustrates an exemplary an exemplary reading operation in accordance with an embodiment of the disclosure. In accordance with aspects of the disclosure, only one reader thread is utilized. Having only one reader thread that reads and processes messages from array 100 ensures that messages are dealt with in the same order in which they are written into array 100 by the writer threads. Aspects of the present disclosure are particularly relevant where order messages are required.

Referring further to FIG. 5, a reader thread determines, at step 502, an index along array 100 to begin reading messages stored in memory chunks 102 at the index position. In an embodiment, the reader thread performs step 502 by looking at read counter 300-B (e.g., ReadChunkCounter). An exemplary pseudocode for performing the determination at step 502 is:

```
byte[ ] message;
UInt64 chunkIndex = __readChunkCounter % __chunkCount;
UInt64 offset = chunkIndex * __chunkSize;
```

The reader thread cannot proceed to read stored messages until a writer thread has reserved a memory chunk 102 ahead of the reader thread along array 100. At step 504, the reader thread determines whether a writer thread has completed a reservation of memory chunks 102 ahead of the reader thread. In an embodiment, the reader thread determines whether write counter 300-A is larger than read counter 300-B. When write counter 300-A is less than or equal to read counter 300-B, the reader thread spins and continuously performs step 504. When write counter 300-A is greater than read counter 300-B, the reader thread determines one or more memory chunks 102 ahead of the reader thread on array 100 have been reserved by a writer thread. In an embodiment, the reader thread sleeps for a predetermined increment, such as about 15 ms. An exemplary pseudocode for performing the determination at step 504 is:

```
While (__readChunkCounter >= __writeChunkCounter)
{
        // Spin, while continuously performing the above
        // comparison.  In an embodiment, may sleep for a 15ms
        // increment.
}
```

The reservation of one or more memory chunks 102 by a writer thread does not guarantee that the writer thread has finished writing its message to those reserved memory chunks. The reader thread determines at step 506 whether the writer thread has finished writing to the reserved memory chunks 102 such that the memory chunks are ready to have the message read therefrom. In an embodiment, the reader thread performs a check against content associated with read ready flag 202 (e.g., ReadReadyFlag) on the first reserved memory chunk 102 to verify that the memory chunk is ready for a reading operation. When the reader thread determines the writing operation is not complete, the reader thread spins and continuously performs step 506. When the reader thread determines the writing operation is complete, the reader thread proceeds to step 508. In an embodiment, the reader thread sleeps for a predetermined increment, such as about 15 ms. An exemplary pseudocode for performing the determination at step 506 is:

```
// Wait until writer finishes writing
MemoryChunk *memoryChunk = (MemoryChunk*)(__chunkArray + offset);
while (memoryChunk -> ReadReadyFlag != true)
{
        // Spin, while continuously performing the above
        // comparison.  In an embodiment, may sleep for a 15ms
        // increment.
}
```

At step 508, the reader thread reads the message from memory chunks 102 of array 100. In an embodiment, step 508 includes the reader thread reading the message content size from message size value 204 of the first chunk and performing a memcpy function starting from the message content pointer from the first chunk (e.g., because the message content is continuous). When a message is larger than a given chunk the message may be split into multiple chunks in accordance with an aspect of the disclosure. An exemplary pseudocode for reading the message at step 508 is:

message=memoryChunk->ReadMessageContent( );

After reading the message, the reader thread resets, at step 510, read ready flag 202 for each memory chunk 102 from which it has read a message. Resetting read ready flag 202 of each memory chunk 102 enables writer threads to use any of the memory chunks as the first chunk for a message. An exemplary pseudocode for resetting read ready flag 202 at step 510 is:

memoryChunk->SetReadReadyFlag(false);

At step 512, the reader thread increments read counter 300-B forward. To move onto reading messages from the next memory chunks 102 in array 100, the reader thread increments read counter 300-B by an amount equal to the number of memory chunks from which the reader thread has just read a message. For example, when the reader thread reads a message that was stored in five memory chunks 102, the reader thread increments read counter 300-B by five. Incrementing read counter 300-B signifies to writer threads that the memory chunks 102 from which the reader thread just read a message are ready for re-use. An exemplary pseudocode for incrementing read counter 300-B at step 512 is:

```
UInt64 numberOfChunks = GetRequiredNumberOfChunks
(memoryChunk);
IncrementReadChunkCounter(numberOfChunks);
```

A memory array architecture in accordance with aspects of the disclosure accommodates reservations of memory chunks 102 circling array 100 faster than the reader thread. In an embodiment, a sudden burst of multiple writer threads may each increment write counter 300-A in a small time-frame with some of the writer threads getting reservations far ahead of the reader thread. In this situation, each new writer thread will increment write counter 300-A until it reaches a value equal to the size of array 100. The next writer thread will increment writer counter 300-A to a value larger than the total number of memory chunks 102 in array 100, effectively wrapping around array 100. For example, in an embodiment in which array 100 is comprised of 10,000 memory chunks 102 indexed from 0-9,999, a writer thread incrementing write counter 300-A to the value 10,000 signifies that the write counter has just circled around array 100. It will be understood by one having ordinary skill in the art that the index of the reserved memory chunk 102 is the modulus of the array size. In other words, the index of the reserved memory chunk 102 can be properly calculated to its position within array 100. Moreover, each writer thread is inherently aware of its position relative to other writer threads and the reader thread. For example, by keeping track of write counter 300-A, a writer thread having reserved the value 10,000 is aware that its reservation is ahead of a writer thread having reserved the value 20,000 even though each thread has reserved the index location 0 in array 100 (e.g., in the embodiment in which array 100 is comprised of 10,000 memory chunks 102 indexed from 0-9,999). The positional information of each reservation is inherently preserved as part of the write counter 300-A value, as explained herein (FIG. 3).

Referring further to an exemplary embodiment in which array 100 is comprised of 10,000 memory chunks 102 indexed from 0-9,999, consider the reader thread starting counter is 0, a first writer thread has calculated its starting counter (e.g. step 406) at 10,000, a second writer thread has calculated its starting counter at 20,000, and a third writer thread has calculated its starting counter at 30,000. In such an embodiment, each of the writer threads is interested in index location 0 in array 100. Preserving and incrementing write counter 300-A continuously ensures that the writer threads will achieve their respective reservations in time order. Because of the subtraction between write counter 300-A and read counter 300-B (e.g., step 412), the first writer thread will always achieve its reservation before the second writer thread, even if the values of the index location in array 100 are overlapping. Moreover, read ready flag 202 manages collisions between multiple writer threads and the read thread (e.g., in array 100 poorly sized for a particular application), as described further herein.

In an embodiment, a writer thread may require a plurality of memory chunks 102 starting at an index location near the end of array 100 such that the message of the writer thread will not fit in the remaining memory chunks of array 100. In such a case, the writer thread can write only a portion of the message to the memory chunks 102 at the end of array 100 and the remainder must be written to memory chunks 102 at the beginning of array 100. In other words, the writer thread wraps the message around array 100. In an embodiment in which the process illustrated in FIG. 4 utilizes continuously increasing unsigned integers, the reservation of memory chunks 102 will be large enough for the message even if the reservation needs to wrap around array 100. The writer threads and reader thread operating in accordance with aspects of the disclosure are capable of observing this situation and ensuring proper handling of the message.

In an embodiment, aspects of the disclosure utilize a write counter 300-A having a maximum size significantly larger than the number of memory chunks 102 of array 100 to ensure that writer threads do not lap the reader thread. For example, utilizing write counter 300-A as an unsigned 64-bit integer and array 100 comprised of 10,000 memory chunks 102, and assuming 10 gigabytes of data being written to array 100 per second, it would take hundreds of thousands of years for the offsets to reach maximum value and thus rollover is not a concern.

In another embodiment, an application programming interface (API) associated with array 100 in accordance with aspects of the disclosure provides a warning message into an error log (e.g., oasErrlog) when a writer thread has been waiting too long (e.g., about two seconds). For example, the waiting may be due to waiting to achieve a reservation of memory chunks 102 and/or due to the reader thread not completing the read operation on the reserved memory chunks 102. In any event in which the writer thread has been waiting too long, the array API warns and exposes the condition to an administrator. One having ordinary skill in the art will understand that the length of time deemed as being too long is application specific.

In yet another embodiment, an API associated with array 100 provides the ability to mark array 100 as failed and write a message into the error log when a writer thread has been waiting too long. In an embodiment, this time waiting limit is longer than the warning limit described above.

In accordance with further embodiments of the disclosure, attempts for read operations and/or write operations fail once array 100 is marked as failed. Any threads waiting for the read thread and/or write thread abandon their wait and return a failure to their caller. In another embodiment, the reader thread clears a failed array 100 and resets it as operational.

In a further embodiment, the reader thread is capable of detecting dead reservations. For example, a writer thread may reserve memory chunks 102 in array 100 and then the given process or thread unexpectedly dies without writing its message into the reserved memory chunks 102. In this circumstance, the reader thread will be waiting indefinitely for read ready flag 202 to be set (e.g., step 506). In such an embodiment, the reader thread has the ability to timeout waiting for read ready flag 202, thereby marking array 100 as failed.

Figure 6:
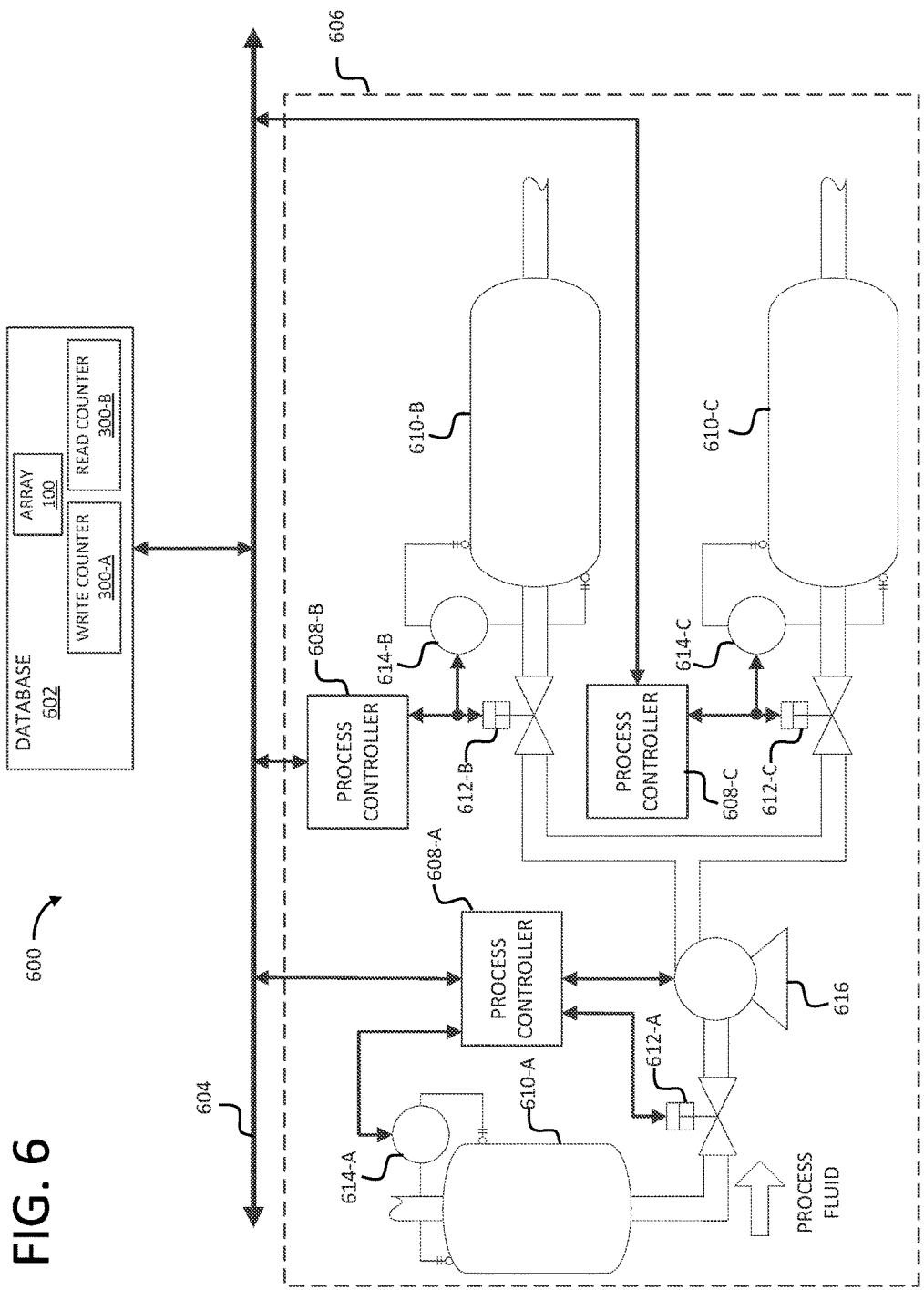
FIG. 6 illustrates an exemplary industrial process system within which aspects of the disclosure may be incorporated.

FIG. 6 illustrates an exemplary system, generally indicated at 600, within which an embodiment of the disclosure may be incorporated. The system 600 includes a database 602, a communications infrastructure 604, and an exemplary plant, such as a fluid processing system 606. As illustrated, the fluid processing system 606 includes process controllers 608, tanks 610, valves 612, sensors 614, and a pump 616. In an embodiment, the database 602, the communications infrastructure 604, the process controllers 608, and the sensors 614 comprise a supervisory control and data acquisition (SCADA) system. In system 600, database 602, process controllers 608, the tanks 610, the valves 612, sensors 614, and the pump 616 are communicatively coupled via communications infrastructure 604.

The database 602 is adapted to provide configuration data values and real-time data values to executing applications that control and/or monitor aspects of fluid processing system 606. In an embodiment, database 602 comprises memory structures on one or more server computing devices. The memory structures of database 602 include a lock-free memory array as described herein, including array 100, write counter 300-A, and read counter 300-B. Additional aspects of database 602 are described herein.

In an embodiment, database 602 includes an architecture comprised of real-time database processes. For example, aspects of the disclosure are pertinent to sending telemetry processor commands in which different remote procedure call (RPC) threads push commands on a single input telemetry processor queue. Within the telemetry processor process, a CommandHandler Thread reads messages from the queue and, based upon a circuit to which they are related, forwards the messages to appropriate CircuitManager Threads. An additional example is within a replication facility in which different threads simultaneously write data to the real-time database, therefore triggering replication and writing replication data related to a particular circuit on a transfer queue. Within replication, a CircuitTransfer Thread reads that data message and multiplexes it to different ConnectionManager Threads.

The communications infrastructure 604 is capable of facilitating the exchange of data among various components of system 600, including database 602 and components of fluid processing system 606 (e.g., process controllers 608, valves 612, sensors 614, etc.). The communications infrastructure 604 in the embodiment of FIG. 6 includes a local area network (LAN) that is connectable to other telecommunications networks, including other LANs or portions of the Internet or an intranet. The communications infrastructure 604 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 604 is any medium that allows data to be physically transferred through serial or parallel communication channels (e.g., copper wire, optical fiber, computer bus, wireless communication channel, etc.). In an embodiment, communications infrastructure 604 comprises at least in part a process control network. In another embodiment, communications infrastructure 604 comprises at least in part a SCADA system.

Still referring to FIG. 6, the fluid processing system 606 is adapted for changing or refining raw materials to create end products. It will be apparent to one skilled in the art that aspects of the present disclosure are capable of optimizing processes and processing systems other than fluid processing system 606 and that system 606 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 608 provide an interface or gateway between components of fluid processing system 606 (e.g., valves 612, sensors 614, pump 616) and other components of system 600 (e.g., database 602). In another embodiment, components of fluid processing system 606 communicate directly with database 602 via communications infrastructure 604. In yet another embodiment, process controllers 608 transmit data to and receive data from database 602, valves 612, sensors 614, and/or pump 616 for controlling and/or monitoring various aspects of fluid processing system 606.

The process controllers 608 of FIG. 6 are adapted to control and/or monitor aspects of fluid processing system 606. In an embodiment, processor controllers 608 are programmable logic controllers (PLC) that control and collect data from aspects of fluid processing system 606. In another embodiment, process controllers 608 are adapted to execute real-time applications that receive configuration data values and real-time data values from database 602, as further described herein.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method, implemented at least in part by one or more computing devices, of synchronizing a plurality of writer threads on a circular array, the circular array comprised of a plurality of memory chunks, each memory chunk mapped to a storage cell of a memory storage device, the method comprising:

reserving, by a first writer thread of the plurality of writer threads, one or more memory chunks of the circular array for a data message associated with the first writer thread, wherein a first write count value corresponding to the memory chunks reserved by the first writer thread is mutually exclusive of one or more write count values corresponding to memory chunks reserved by writer threads other than the first writer thread; and writing, by the first writer thread, the data message associated therewith to the memory chunks of the circular array reserved thereby when a read count value representing a current index of a reader thread on the circular array is less than one iteration of the circular array from the first write count value.

2. The method of claim 1, wherein the memory chunks of the circular array reserved by the first writer thread are continuous in the circular array.

3. The method of claim 1, further comprising:

reserving, by a second writer thread of the plurality of writer threads, one or more memory chunks of the circular array for a data message associated with the second writer thread, wherein the second writer thread is different from the first writer thread, wherein a second write count value corresponding to the memory chunks reserved by the second writer thread is mutually exclusive of the first write count value and mutually exclusive of the one or more write count values corresponding to memory chunks reserved by writer threads other than the second writer thread and the first writer thread; and writing, by the second writer thread, the data message associated therewith to the memory chunks of the circular array reserved thereby when the read count value is less than one iteration of the circular array from the second write count value.

4. The method of claim 3, further comprising atomically incrementing, by each of the plurality of writer threads, the write count values corresponding to the memory chunks reserved thereby by a number of the memory chunks required for storing the data messages associated therewith.

5. The method of claim 3, wherein the first writer thread performs said reserving thereby and said writing thereby concurrently with the second writer performing said reserving thereby and said writing thereby.

6. The method of claim 1, further comprising reading, by the reader thread, the data message associated with the first writer thread when the read count value represents the index of the memory chunks of the circular array reserved by the first writer thread, wherein the data messages each comprise a real-time data value corresponding to a process device within a continuous process, said continuous process including a supervisory control and data acquisition (SCADA) system.

7. The method of claim 1, further comprising determining, by the first writer thread, a starting index of the one or more memory chunks reserved thereby as a function of a size of the circular array.

8. The method of claim 7, further comprising determining, by the first writer thread, an address of the memory chunks of the circular array reserved thereby as a function of the starting index and a size of the memory chunks.

9. The method of claim 1, further comprising spinning the first writer thread when the read count value is one iteration or more of the circular array from the first write count value.

10. A computer readable storage device having processor readable instructions stored thereon including instructions that, when executed by a processor, implement a method of coordinating a plurality of writer threads on a queue, comprising:

incrementing, by each writer thread of the plurality of writer threads, a write counter as a function of a size of a data message of each writer thread, wherein each writer thread is associated with a value of the write counter incremented thereby, and wherein the write counter value associated with each writer thread is mutually exclusive of the write counter values associated with every other writer thread of the plurality of writer threads;

reserving, by each writer thread, one or more memory chunks for the data message thereof, wherein the memory chunks comprise the queue, and wherein the memory chunks reserved by each writer thread have an element identifier within the queue of the modulus of the write counter value associated therewith and a size of the queue; and writing, by each writer thread, the data message thereof to the memory chunks of the queue reserved thereby when a read count value representing a current position of a reader thread on the queue is less than one iteration of the queue therefrom.

11. The computer readable storage device of claim 10, wherein the memory chunks reserved by each writer thread are continuous within the queue.

12. The computer readable storage device of claim 10, wherein each writer thread performs said incrementing sequentially, and wherein each writer thread performs said reserving and said writing concurrently.

13. The computer readable storage device of claim 10, the instructions including instructions that, when executed by the processor, implement the method of coordinating the plurality of writer threads on the queue, the method further comprising reading, by the reader thread, the data messages stored in each memory chunk having data messages written thereto by the plurality of writer threads, wherein the data messages each comprise a real-time data value corresponding to a process device within a continuous process, said continuous process including a supervisory control and data acquisition (SCADA) system.

14. The computer readable storage device of claim 10, the instructions including instructions that, when executed by the processor, implement the method of coordinating the plurality of writer threads on the queue, the method further comprising determining, by each writer thread, a starting index of the memory blocks reserved thereby as a function of a size of the queue.

15. The computer readable storage device of claim 14, the instructions including instructions that, when executed by the processor, implement the method of coordinating the plurality of writer threads on the queue, the method further comprising determining, by each writer thread, an address of the memory chunks reserved thereby as a function of the determined starting index and a size of the memory chunks.

16. The computer readable storage device of claim 14, the instructions including instructions that, when executed by the processor, implement the method of coordinating the plurality of writer threads on the queue, the method further comprising spinning each writer thread when the read count value is one iteration or more of the queue from the write count value of each writer thread.

17. A computing device comprising:

a processor; and one or more processor-executable instructions stored on a computer-readable storage medium of the computing device, said processor-executable instructions including instructions that, when executed by the processor, provide:

an array comprised of a plurality of memory chunks, wherein each of the memory chunks represents one or more contiguous memory addresses in an address space, wherein the array has a predefined size, and wherein the array is adapted for a first-in, first-out utilization of the memory chunks;

a write chunk counter comprising an index for a plurality of writer threads on the array, wherein the write chunk counter is adapted to provide a value to each writer thread that is mutually exclusive of the value provided to every other writer thread of the plurality of writer threads for reserving one or more of the memory chunks;

a read chunk counter comprising an index and a number of iterations of a reader thread on the array, wherein the memory chunks are adapted to have a data message associated with each of the writer threads written thereto by the writer threads when the read chunk counter is less than one iteration of the array from the index of the writer threads.

18. The computing device of claim 17, wherein the memory chunks are adapted to have the data messages associated with each of the writer threads written thereto concurrently.

19. The computing device of claim 17, wherein the data messages each comprise a real-time data value corresponding to a process device within a continuous process, said continuous process including a supervisory control and data acquisition (SCADA) system.

20. The computing device of claim 17, wherein the memory chunks are adapted to store the data messages associated with a particular writer thread of the plurality of writer threads until the read chunk counter is less than one iteration of the array from the write chunk value of the particular writer thread.

* * * * *